(12) United States Patent
Kim

(10) Patent No.: US 9,250,833 B2
(45) Date of Patent: Feb. 2, 2016

(54) PRINTING CONTROL TERMINAL DEVICE AND METHOD OF PRINTING XML PAPER SPECIFICATION (XPS) FILE

(75) Inventor: Na-young Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 637 days.

(21) Appl. No.: 12/844,915

(22) Filed: Jul. 28, 2010

(65) Prior Publication Data

US 2011/0149314 A1 Jun. 23, 2011

(30) Foreign Application Priority Data

Dec. 17, 2009 (KR) .......................... 10-2009-126247

(51) Int. Cl.
*G06F 15/00* (2006.01)
*G06F 3/12* (2006.01)

(52) U.S. Cl.
CPC ............ *G06F 3/1205* (2013.01); *G06F 3/1206* (2013.01); *G06F 3/1246* (2013.01); *G06F 3/1255* (2013.01); *G06F 3/1208* (2013.01)

(58) Field of Classification Search
None
See application file for complete search history.

(56) References Cited

U.S. PATENT DOCUMENTS

| | | | | |
|---|---|---|---|---|
| 6,661,530 B1* | 12/2003 | Munetomo et al. | .......... | 358/1.15 |
| 7,907,313 B2* | 3/2011 | Kurihara | ....................... | 358/500 |
| 7,916,330 B2* | 3/2011 | Wada et al. | ................... | 358/1.15 |
| 7,916,332 B2* | 3/2011 | Kato | ............................. | 358/1.15 |
| 7,920,280 B2* | 4/2011 | Furuya | ......................... | 358/1.13 |
| 7,999,951 B2* | 8/2011 | Ferlitsch | ....................... | 358/1.13 |
| 8,023,135 B2* | 9/2011 | Levin et al. | .................... | 358/1.15 |
| 8,094,332 B2* | 1/2012 | Nakamura | ................... | 358/1.15 |
| 8,111,422 B2* | 2/2012 | Furuya | ......................... | 358/1.3 |
| 8,134,729 B2* | 3/2012 | Kimura | ........................ | 358/1.15 |
| 8,213,037 B2* | 7/2012 | Klave et al. | .................. | 358/1.15 |
| 8,274,670 B2* | 9/2012 | Hasegawa | .................... | 358/1.13 |
| 8,305,610 B2* | 11/2012 | Furuya | ......................... | 358/1.15 |
| 8,310,701 B2* | 11/2012 | Sakura | ......................... | 358/1.15 |
| 8,320,001 B2* | 11/2012 | Mitsui | .......................... | 358/1.15 |
| 8,335,002 B2* | 12/2012 | Kawara | ......................... | 358/1.15 |
| 8,614,812 B2* | 12/2013 | Huh et al. | ..................... | 358/1.15 |
| 2004/0047643 A1* | 3/2004 | Jackelen et al. | ................ | 399/81 |
| 2007/0076250 A1* | 4/2007 | Kudo | ............................ | 358/1.15 |
| 2007/0216925 A1* | 9/2007 | Nakamura | ................... | 358/1.13 |
| 2007/0216944 A1* | 9/2007 | Furuya | ......................... | 358/1.15 |
| 2008/0088885 A1* | 4/2008 | Miyazaki et al. | ............. | 358/402 |
| 2008/0158581 A1* | 7/2008 | Ferlitsch | ....................... | 358/1.13 |
| 2008/0174811 A1* | 7/2008 | Tanaka et al. | ................ | 358/1.15 |
| 2008/0266604 A1* | 10/2008 | Kuroki et al. | ................. | 358/1.16 |
| 2008/0309992 A1* | 12/2008 | Kimura | ........................ | 358/474 |
| 2009/0086239 A1* | 4/2009 | Selvaraj | ........................ | 358/1.13 |
| 2009/0109475 A1* | 4/2009 | Honda | .......................... | 358/1.15 |
| 2009/0147308 A1* | 6/2009 | Hasegawa | .................... | 358/1.15 |

(Continued)

*Primary Examiner* — Ted Barnes
(74) *Attorney, Agent, or Firm* — Staas & Halsey LLP

(57) ABSTRACT

A printing control terminal device includes a user interface to receive a command to print an XPS file on an XPS viewer, an analyzing unit to analyze at least one of a print ticket, a core property, and a digital signature included in the XPS file, and to distinguish a first setting information to be applied to a printing job and a second setting information not to be applied to a printing job, a conversion unit to convert at least one of the print ticket, the core property, and the digital signature corresponding to the second distinguished setting information to be applied to the printing job, a driver to generate print data using the second converted setting information and the first setting information, and a communication interface to transmit the generated print data to the image forming apparatus.

21 Claims, 14 Drawing Sheets

(56) References Cited

U.S. PATENT DOCUMENTS

| | | | |
|---|---|---|---|
| 2009/0268234 A1* | 10/2009 | Furuya | 358/1.15 |
| 2009/0268239 A1* | 10/2009 | Kawara | 358/1.15 |
| 2009/0290185 A1* | 11/2009 | Shiohara | 358/1.13 |
| 2010/0053670 A1* | 3/2010 | Jeong et al. | 358/1.15 |
| 2010/0118332 A1* | 5/2010 | Nakata | 358/1.15 |
| 2010/0128306 A1* | 5/2010 | Han | 358/1.15 |
| 2010/0157364 A1* | 6/2010 | Kim | 358/1.15 |
| 2010/0214599 A1* | 8/2010 | Zhan | 358/1.15 |
| 2010/0214614 A1* | 8/2010 | Ferlitsch et al. | 358/1.18 |
| 2010/0296122 A1* | 11/2010 | Mitsui | 358/1.15 |
| 2011/0081892 A1* | 4/2011 | Graham et al. | 455/413 |
| 2011/0116131 A1* | 5/2011 | Mitsui | 358/1.15 |
| 2011/0149326 A1* | 6/2011 | Kurihara | 358/1.13 |

* cited by examiner

FIG. 2

| Child | Description |
|---|---|
| Option psk:None | This Option specifies that a banner sheet will not be output |
| Option psk:Standard | This Option specifies that the banner sheet that is generated by the device software will be output |
| Option psk:Custom | This Option specifies that a custom banner sheet will be output<br>If the psk:BannerSheetSource Property is not specified in a PrintTicket document, this setting SHOULD be ignored by PrintTicket consumers and the default setting used in its place |

| Characteristic | Details | |
|---|---|---|
| Name | psk:JobPrimaryBannerSheetSource | |
| Valid For | PrintCapabilities documents | |
| Element Type | ParameterDef | |
| Contents | The psk:JobPrimaryBannerSheetSource Parameter is a StringParamType, as describe in §2.1.3.1,"<psf:ParameterDef>". | |
| | Child | Description |
| | StringParamType | The psf:MinLength Property Value MUST be 0 or greater. The psf:MaxLength Property Value MUST be greater than the psf:MinLength Property Value. The psf:MaxLength Property Value SHOULD be less than 65536 bytes. The psf:Mandatory Property Value MUST be psk:Conditional. The psf:UnitType Property Value MUST be characters. |

```
<psf:ParameterInit name="psk:DocumentBannerSheetSource">
   <psf:Value xsi:type="xs"string">/Documents/2/Pages/1.page</psf:Value>
</psf:ParameterInit>
```

| Child | Description |
|---|---|
| 810 — Option psk:PrintInvalidSignatures | This Option specifies that the print job should be output regardless of the validity of the digital signatures. Digital signatures MAY be ignored. |
| 820 — Option psk:PrintInvalidSignaturesWithErrorReport | This Option specifies that the print job should be output regardless of the validity of the digital signatures. If an invalid signature or a signature that is not verifiable is encountered, an error page MUST print as the last sheet of the print job. |
| 830 — Option psk:PrintOnlyValidSignatures | This Option specifies that the print job should be output only if all digital signatures are valid and verifiable. |

FIG. 9

| JobDigitalSignatureProcessing Option | Devmode |
|---|---|
| PrintInvalidSignatures | DigtalSignature[page number].ubPrintPage = 1, DigtalSignature[page number].ubErrorSheet = 0 |
| PrintInvalidSignatureWithErrorReport | DigtalSignature[page number].ubPrintPage = 0, DigtalSignature[page number].ubErrorSheet = 1 |
| PrintOnlyValidSignature | DigtalSignature[page number].ubPrintPage = 0, DigtalSignature[page number].ubErrorSheet = 0 |

```
@PJLCOMMENT CREATOR="Alan Shen"
@PJLCOMMENT CREATED DATE="2005-06-12"
@PJLCOMMENT CONTENT TYPE="Functional Specification"
@PJLCOMMENT TITLE="OPC Core Properties"
@PJLCOMMENT DESCRIPTION="Spec defines the schema for OPC Core Properties and their
location with in the package"
@PJLCOMMENT LANGUAGE="ENG"
@PJLCOMMENT VERSION="1.0"
@PJLCOMMENT LASTMODIFIEDBY="Alan Shen"
@PJLCOMMENT LASTMODIFIED DATE="2005-11-23"
@PJLCOMMENT CONTENT STATUS="Reviewed"
```

FIG. 12

```
DOCEVENT_FILTER * p = (DOCEVENT_FILTER*) pvOut;
switch (iEsc) {
case DOCUMENTEVENT_XPS_QUERYFILTER:
   if (p->cElementsAllocated >= 7) {
      p->aDocEventCall[0] =
      DOCUMENTEVENT_XPS_ADDFIXEDDOCUMENTSEQUENCEPRINTTICKETPRE;
      p->aDocEventCall[1] =
      DOCUMENTEVENT_XPS_ADDFIXEDDOCUMENTSEQUENCEPRINTTICKETPOST;
...
      p->cElementsReturned = 7;
   } else { p->cElementsNeeded = 7; }
   break;
case DOCUMENTEVENT_XPS_ADDFIXEDDOCUMENTSEQUENCEPRINTTICKETPRE:
   *((PrintPropertiesCollection **) pvOut) =
      ReplacePT((PrintPropertiesCollection *) pvIn);
   break;
case DOCUMENTEVENT_XPS_ADDFIXEDDOCUMENTSEQUENCEPRINTTICKETPOST:
   DeleteCollection(*((PrintPropertiesCollection **) pvIn));
   break;
}
```

PRINTING CONTROL TERMINAL DEVICE AND METHOD OF PRINTING XML PAPER SPECIFICATION (XPS) FILE

CROSS-REFERENCE TO RELATED APPLICATIONS

This application claims priority under 35 U.S.C. §119(a) from Korean Patent Application No. 2009-126247, filed on Dec. 17, 2009, in the Korean Intellectual Property Office, the contents of which are incorporated herein by reference in its entirety.

BACKGROUND

1. Field of the Invention

The present general inventive concept relates to a printing control terminal device, and a method of printing an XML (extensible markup language) paper specification (XPS) file. More particularly, the present general inventive concept relates to a printing control terminal device and a method of printing an XPS file to generate print data for an XPS file to minimize losing information included in the XPS file.

2. Description of the Related Art

Generally, an image forming apparatus such as a copier, a printer, a facsimile, or a multi function peripheral (MFP) which integrates the functions of the copier, printer, facsimile, etc., operates to print the print data generated by a terminal such as a computer onto a recording sheet.

Image forming apparatuses which have been recently introduced support direct printing on print data written in a printable document format (PDF), a tagged image file format (TIFF), a joint photographic experts group (JPG), or the like. The direct printing refers to a process where a printing job is directly performed only by transmitting a document to be printed to an image forming apparatus without executing an additional application program on a terminal device such as a personal computer (PC), a laptop computer, a personal digital assistant (PDA), a digital camera, or the like.

There is an XPS file which supports such a direct printing. An XPS file is an electronic file having a fixed-layout that preserves document formatting and can be shared, and refers to a zip-formatted file which includes all kinds of data and resources described by systematizing all resources required for documents or operations in a directory structure and by writing the references therebetween in XML.

However, the operation of converting an XPS file into print data capable of being recognized by the image forming apparatus is needed in order that the image forming apparatus on which an XPS emulator is not mounted outputs such an XPS file. There has been a problem that information set on an XPS file is lost since a conventional printer driver generates print data using only the data provided by an application program. For instance, if a printing option '4-up' is set on an XPS file, a conventional printer driver cannot perform a printing job suitable for an intention of a user due to a default '1-up'.

In addition, a conventional driver performs a printing job without authorization even when information on a digital signature is set on an XPS file, causing a problem regarding security.

Moreover, when a printing control terminal device on which an XPS driver is not installed outputs an XPS file through an XPS viewer, the printing control terminal device loses information set on the XPS file.

SUMMARY

The present general inventive concept provides a printing control terminal device to generate print data for an XPS file by minimizing losing information included in the XPS file and a method of controlling a printing job thereof.

Additional features and utilities of the present general inventive concept will be set forth in part in the description which follows and, in part, will be obvious from the description, or may be learned by practice of the general inventive concept.

Exemplary embodiments of the present general inventive concept may provide a printing control terminal device to be communicatively coupled to at least one image forming apparatus, the printing control terminal device on which a printer driver to print an XML paper specification (XPS) file is not installed, the printing control terminal device including a user interface to receive a command to print an XPS file on an XPS viewer, an analyzing unit to analyze at least one of a print ticket, a core property, and a digital signature included in the XPS file, and to distinguish a first setting information to be applied to a printing job and a second setting information not to be applied to a printing job, a conversion unit to convert at least one of the print ticket, the core property, and the digital signature corresponding to the distinguished second setting information to be applied to the printing job, a driver to generate print data using the converted second setting information and the first setting information, and a communication interface to transmit the generated print data to the at least one image forming apparatus.

The driver may include at least one of a Samsung® printer language (SPL) printer driver, a printer command language (PCL) printer driver, a PostScript® (PS) printer driver, a Linux® printer driver, and a Macintosh® (MAC) printer driver.

The setting information may include printing information (Devmode) on a legacy printer driver corresponding to the print ticket, and the analyzing unit distinguishes the first setting information when the printing information is applied to a printing job and distinguishes the second information when the printing information is not applied to a printing job.

The user interface may display the second setting information which is not applied to the printing job, and receives a selection of at least one to be applied to the printing job from among the second setting information, and the driver generates print data using the second converted setting information corresponding to the selected information and the first setting information.

The second displayed setting information may include at least one of a banner output, N-up, a booklet, and a watermark.

The driver may generate the print data if the converted digital signature is valid.

The XPS file may include at least one digital signature, and the driver generates print data for an area corresponding to a valid digital signature.

The conversion unit may convert the core property into a printer job language (PJL) command.

The conversion unit may receive a print ticket included in the XPS file through a configuration module, and convert the received print ticket into printing information (Devmode).

Exemplary embodiments of the present general inventive concept may also provide a method of printing an XML paper specification (XPS) file of a printing control terminal device to be communicatively coupled to at least one image forming apparatus, the printing control terminal device on which a printer driver to print an XML paper specification (XPS) file is not installed, the method including receiving a command to print an XPS file on an XPS viewer receiving the XPS file on a legacy printer driver, analyzing at least one of a print ticket, a core property, and a digital signature included in the XPS file, and distinguishing a first setting information to be applied to a printing job and a second setting information not to be applied to a printing job, converting at least one of the print ticket, the core property, and the digital signature corresponding to the second distinguished setting information, generating print data using the second converted setting information and the first setting information; and transmitting the generated print data to the image forming apparatus.

The legacy printer driver may include at least one of a Samsung® printer language (SPL) printer driver, a printer command language (PCL) printer driver, a PostScript® (PS) printer driver, a Linux® printer driver, and a Macintosh® (MAC) printer driver.

The setting information may include printing information (Devmode) on the legacy printer driver corresponding to the print ticket, and the analyzing distinguishes the first setting information when the printing information is applied to a printing job and distinguishes the second information when the printing information is not applied to a printing job.

The method may further include displaying the second setting information which is not applied to the printing job, and receiving a selection of at least one to be applied to the printing job from among the second setting information, wherein the generating may generate print data using the second converted setting information corresponding to the selected information and the first setting information.

The second displayed setting information may include at least one of a banner output, N-up, a booklet, and a watermark.

The generating may generate the print data if the converted digital signature is valid.

The XPS file may include at least one digital signature, and the driver generates print data for an area corresponding to a valid digital signature.

The converting may convert the core property into a printer job language (PJL) command.

Exemplary embodiments of the present general inventive concept may also provide a method of printing an XML paper specification (XPS) file of a printing control terminal device to be communicatively coupled to at least one image forming apparatus, the printing control terminal device on which a printer driver to print an XML paper specification (XPS) file is not installed, the method including receiving a command to print an XPS file on an XPS viewer, receiving the XPS file on a legacy printer driver, receiving a print ticket included in the XPS file through a configuration module, converting the received print ticket into printing information (Devmode), generating print data using the printing information, and transmitting the generated print data to the image forming apparatus.

Exemplary embodiments of the present general inventive concept also provide a method of printing an XML paper specification (XPS) file of a printing control terminal device with at least one image forming apparatus that is communicatively coupled to the printing control terminal device, the method including receiving an XPS file including a print ticket and a command to print the XPS file, converting the received print ticket into printing information, generating print data using the printing information, and printing the generated print data to the image forming apparatus.

The method may also include analyzing at least one of a print ticket, a core property, and a digital signature included in the XPS file, and distinguishing a first setting information to be applied to a printing job and a second setting information not to be applied to a printing job.

The method may also include converting the at least one print ticket, the core property, and the digital signature corresponding to the second distinguished setting information.

The method may also include generating print data using the second converted setting information and the first setting information.

Exemplary embodiments of the present general inventive concept may also provide a printing control terminal apparatus communicatively coupled to at least one image forming apparatus, the apparatus including an interface to receiving an XML paper specification (XPS) file including a print ticket and a command to print the XPS file, and a controller to convert the received print ticket into printing information and to generate print data using the printing information, where the generated print data is transmitted to the image forming apparatus with the interface.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 2, 4, 5, 8, and 10 are views illustrating printing options that may be set in an XPS file according to exemplary embodiments of the present general inventive concept;

FIGS. 3, 6, and 9 are views illustrating printing information (Devmode) converted according to exemplary embodiments of the present general inventive concept;

FIG. 11 is a view illustrating a printer job language (PJL) command generated according to exemplary embodiments of the present general inventive concept;

FIG. 12 is a view illustrating a sample code of a configuration module according to exemplary embodiments of the present general inventive concept;

DETAILED DESCRIPTION OF THE EMBODIMENTS

Figure 1:
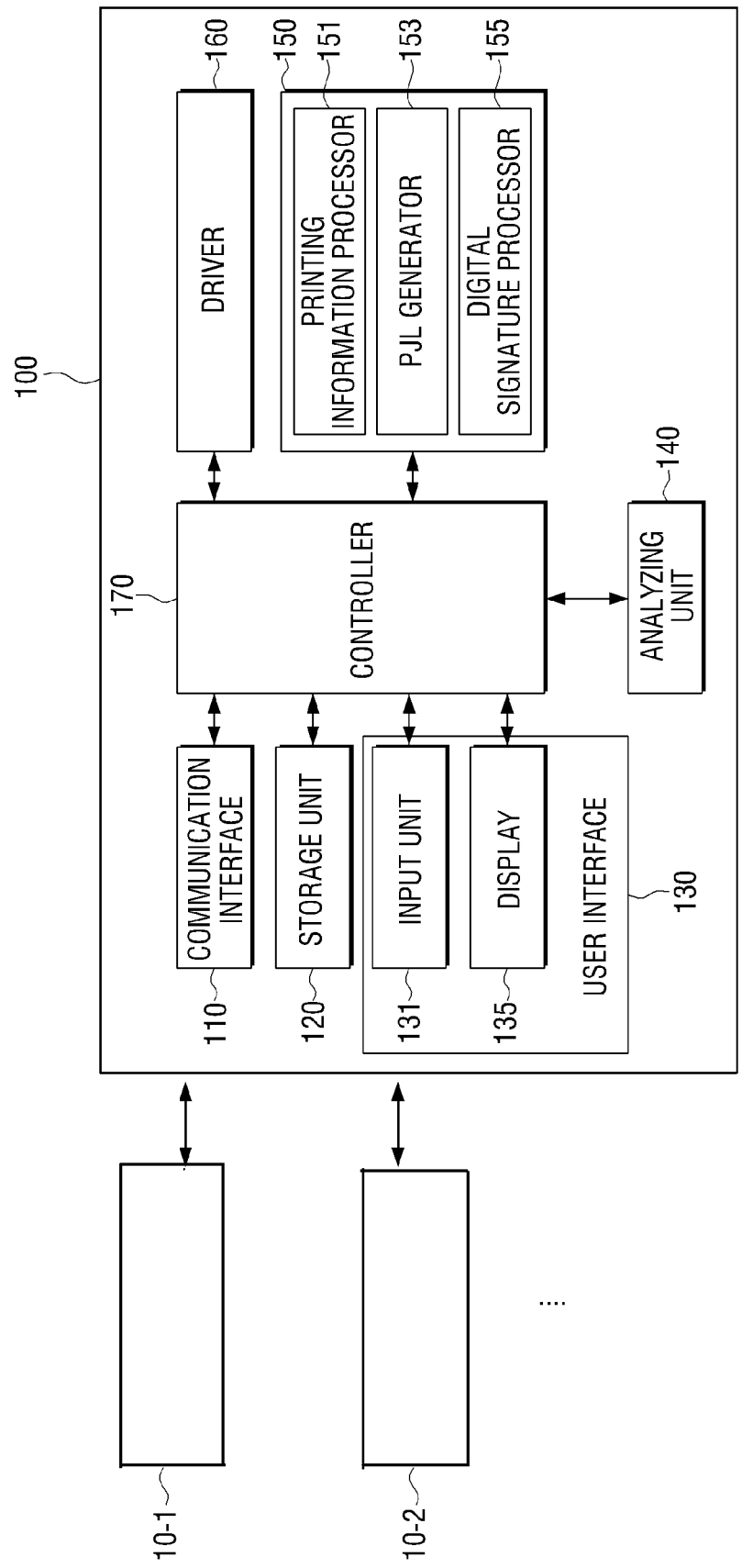
FIG. 1 is a block diagram illustrating a printing control terminal device according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures FIG. 1 is a block diagram illustrating a printing control terminal device according to exemplary embodiments of the present general inventive concept. Referring to FIG. 1, the printing control terminal device 100 can include a communication interface 110, a storage unit 120, user interface 130 (e.g., input unit 131 and display 135), an analyzing unit 140, a conversion unit 150, a driver 160, and a controller 170.

The communication interface 110 can be communicatively coupled to image forming apparatuses 10-1, 10-2, ..., via a wired and/or wireless communication network and/or link, and can provide print data that the image forming apparatuses can process. Herein, the print-processable print data may include page description language (PDL) data written in a printer command language (PCL) or a post script (PS) language. The communication interface 110 communicatively couple the printing control terminal device 100 to an external device. The communication interface 110 may be communicatively coupled with the image forming apparatuses 10-1, 10-2, ... via a wired and/or wireless local area network (LAN), Internet network, or a universal serial bus (USB) port. In FIG. 1, two image forming apparatuses 10-1, 10-2 can be communicatively coupled via a wired and/or wireless link to the printing control terminal 100. Alternatively, a single image forming apparatus may be communicatively coupled via a wired and/or wireless link to the printing control terminal 100, or two or more image forming apparatuses may also be communicatively coupled to the printing control terminal device 100. In addition, the image forming apparatuses 10-1, 10-2, ... can be communicatively coupled to the printing control terminal device 100 in FIG. 1, but may communicatively couple the image forming apparatuses 10-1, 10-2, ... to the printing control terminal device 100 through a server or a router.

The storage unit 120 stores an XPS file. In more detail, the storage unit 120 may store an XPS file which is generated (e.g., generated by a user) with an application program or an XPS file which is generated by a previous operation. The storage unit 120 may store a PJL command and print data which are generated in one or more operations described below. The storage unit 120 may pre-store a lookup table to convert a printing option on an XPS file into printing information. In addition, the storage unit 120 may store information which is obtained from an XPS file analyzed by the analyzing unit 140. The storage unit 120 may be a removable disk including a USB memory or a web server via network.

In exemplary embodiments of the present general inventive concept, the XPS file can include print data of which printing options are set in a hierarchical tree structure having a plurality of layers. The XPS file can have a plurality of layers, and a different printing option may be set for each node of each tree.

An XPS file may include information on a digital signature in various printing ranges such as an entire document, a specific layer, a specific page, and a specific portion within a page. An XPS file may include a core property such as a drafter, date, latest modified date, a document name, and so on.

The user interface 130 may include the input unit 131 and/or the display unit 135, where the user interface 130 may include a plurality of function keys through which a user may set or select various functions supported by the printing control terminal device 100, and display various information provided by the printing control terminal device 100.

The input unit 131 may include a plurality of function keys through which a user sets or selects various functions supported by the printing control terminal device 100. The input unit 131 may be implemented as a keyboard or a mouse.

The display 135 may display information provided by the printing control terminal device 100. The display 135 may be a cathode ray tube (CRT), a liquid crystal display (LCD), a plasma display panel (PDP), a light emitting diode (LED) or organic light emitting diode (OLED) display, or any other suitable display to carry out the exemplary embodiments of the present general inventive concept. A user may select an XPS file using the displayed various information in order to perform a printing job, and input a command to print the XPS file. The printing control terminal device 100 may display an XPS file using an XPS viewer even if an XPS driver is not installed. The user interface 130 may receive a command to print an XPS file on an XPS viewer.

The user interface 130 may display the second setting information which is distinguished by the analyzing unit 140. From among the second setting information which has not been applied to the printing job, a user may select at least one setting to be applied to the printing job with the user interface 130. That is, the user interface 130 can receive a selection of the at least one setting information to be applied to the printing job. Herein, the second setting information may be a printing option which has not been applied when a legacy printer driver generates print data capable of being recognized by an image forming apparatus from among printing options, core properties, and digital signatures included in an XPS file.

The user interface 130 may display contradictory printing options to the printing options set on an XPS file. Specifically, the user interface 130 may display a printing option contradictory to a printing option preset on the driver 160 from among printing options set on the XPS file. For instance, if a printing option '4-up' is preset on an XPS file, and another printing option '1-up' is preset on the driver 160, the user interface 130 may display the printing option '4-up' set on the XPS file as a contradictory printing option.

The user interface 130 may display printing options that the image forming apparatuses 10-1, 10-2, ... may not support among printing options set on an XPS file. For example, if a printing option '8-up' is set on an XPS file, and the image forming apparatus 10 connected to the printing control terminal 100 may not support the printing option '8-up', the user interface 130 may display an unavailability of the printing option '8-up' set on an XPS file.

The user interface 130 may receive one or more selections and/or instructions to process the contradictory printing option and the unavailable printing option from a user. In more detail, the user interface 130 may receive a selection of an alternative printing option for a contradictory printing option or an unavailable printing option, and may receive a selection of whether to preferentially apply a printing option set on an XPS file, or to preferentially apply a printing option preset on a driver, or to automatically change a printing option and apply it, or may receive any other suitable selection to carry out the exemplary embodiments of the present general inventive concept.

The user interface 130 may transfer one or more received selections and/or instructions to process a printing option to the conversion unit 150 and the driver 160 so that the one or more selection and/or instructions selected by a user are applied. The user interface 130 may include the input unit 131 and the display 135 in exemplary embodiments of the present general inventive concept, but a device such as a touch pad which provides a concurrent input and output may also be used as or be included with the user interface 130.

The analyzing unit 140 may analyze information set on an XPS file. Specifically, the analyzing unit 140 can parse an XPS file and analyze a printing option, a core property, and at least information including a digital signature.

In more detail, the analyzing unit 140 can analyze a hierarchical print ticket included in an XPS file, and can analyze a printing option to be applied to one or more of the page areas (e.g., each of page areas) included in an XPS file, as a printing option of the XPS file can be set differently on one or more hierarchical layers (e.g., each of the hierarchical layers) as described above.

A digital signature may be set on one or more areas of the XPS file. The analyzing unit 140 may recognize whether a digital signature is set on an XPS file or not. If a digital signature is set on an XPS file, the analyzing unit 140 may analyze a page area to which a digital signature set on the XPS file is applied.

An XPS file can be an open packaging convention (OPC) document, and the XPS file may include at least one core property. The core property may exist in an XPS file in a separate file format, and may also exist in a particular print ticket. The analyzing unit 140 may analyze the at least one core property set on an XPS file by analyzing the separate files in the XPS file and one or more print tickets (e.g., each print ticket).

The analyzing unit 140 may distinguish between the first setting information which is applied to the printing job and the second setting information which is not applied to the printing job, among a print ticket, a core property, and a digital signature included in the XPS file. Herein, the first setting information can correspond to a printing option which is applied when a legacy printer driver generates print data that may be recognized by the image forming apparatus among a print ticket, a core property, and a digital signature included in an XPS file. The second setting information can correspond to a printing option which is not applied when a legacy printer driver generates print data to be recognized by the image forming apparatus among a print ticket, a core property, and a digital signature included in an XPS file. For example, the second setting information may be a printing option such as a banner output, N-up, a booklet, a watermark, or the like.

Herein, the setting information can include printing information (Devmode) of a legacy printer driver corresponding to a print ticket, and the analyzing unit 140 may distinguish the first and second setting information using the printing information.

The conversion unit 150 may convert the analyzed information into information that can be analyzed by the image forming apparatuses 10-1, 10-2, . . . . In more detail, the conversion unit 150 may convert the second information into information that can be analyzed by the driver 160 or the image forming apparatus so that a print ticket, a core property, and a digital signature corresponding to the second information are applied to print data generated by the driver 160. The conversion unit 150 can include a printing information processor 151, a printer job language (PJL) generator 153, and a digital signature processor 155.

The printing information processor 151 may convert information of a printing option set on an XPS file into printing information (Devmode). In more detail, the printing information processor 151 may convert a printing option set on an XPS file into printing information (Devmode) which the image forming apparatus can analyze using a pre-stored lookup table. Herein, the printing information (Devmode) may be information related to a printing option which is commonly defined on the image forming apparatuses 10-1, 10-2, . . . and the driver 160. The operation of converting printing option information into printing information will be explained in detail with reference to FIGS. 2 to 5.

The printing information processor 151 may recognize whether an XPS file has a printing option contradictory to the printing option preset on the driver 160. For example, if a printing option '4-up' is set on an XPS file, but another printing option '1-up' is preset on the driver 160, the printing information processor 151 may determine the printing option '4-up' set on the XPS file as a contradictory printing option.

The printing information processor 151 may recognize whether an XPS file has a printing option which the image forming apparatuses 10-1, 10-2, . . . may not support. For instance, if a printing option '8-up' is set on an XPS file, and the image forming apparatuses 10-1, 10-2, . . . do not support only from '1-up' to '4-up', the printing information processor 151 may determine the printing option '8-up' set on the XPS file as a contradictory printing option.

The printing information processor 151 may control a contradictory printing option and a printing option supported by the image forming apparatus. Specifically, the printing information processor 151 can provide that the contradictory printing option have priority over a preset printing option be applied to the driver 160 when receiving a processing selection from a user through the user interface 130 or using a preset processing method, or can convert printing option information into printing information (Devmode) by converting an unavailable printing option of the image forming apparatuses into an available printing option having, for example, the similar function to that of the unavailable printing option.

The PJL generator 153 may convert a core property included in an XPS file into a PJL command. Specifically, the PJL generator 153 may convert one or more of the core properties (e.g., each of the core properties) included in an XPS file into a corresponding PJL command. The PJL generator 153 may combine a PJL command generated to correspond to a core property with a PJL command generated by the driver 160.

The PJL generator 153 may control the communication interface 110 to transmit the generated PJL command prior to the print data generated by the driver 160 to the image forming apparatus.

The digital signature processor 155 can determine validity of information on a digital signature set on an XPS file, and can generate information regarding an output page of the XPS file. Specifically, the digital signature processor 155 may recognize whether a digital signature set on an XPS file is valid or not, and thus recognize whether or not to print an area on which the digital signature is set. For example, if a digital signature that provides that only an authorized user print a document is set on an XPS file, the digital signature processor 155 may recognize whether the user who inputs a print command corresponds to the authorized user or not.

If the user who inputs a print command is not the authorized user, the digital signature processor 155 may prevent an area on which a digital signature is set from being printed. In more detail, the digital signature processor 155 may provide to the driver 160 information where a print range of a page to be output has been adjusted to prevent an area on which a digital signature is set from being output, and provide information of a page having errors to the driver 160 so that an error page is output for an area on which a digital signature has been set. Herein, the information of the page to be output is an example of printing information (Devmode) as described above. Herein, the information of the page to be output can be an example of printing information (Devmode) as described above.

The driver 160 may generate print data for an XPS file to which changed information is applied. Specifically, the driver 160 may generate print data using the second changed setting information and the first setting information. In more detail, the driver 160 may generate PDL print data capable of being recognized by the image forming apparatus using the printing information (Devmode) converted by the printing information processor 151 and data of an XPS file provided by application such as an XPS file viewer. Herein, the driver 160 may include one or more functions of a legacy printer such as an SPL printer driver, a PCL printer driver, and an MAC printer driver.

The driver 160 may convert printing information into a PJL command among the provided printing information (Devmode). For example, if a printing option such as document information output, storing a file after printing, n-up, or the like is set on an XPS file, the driver 160 may convert printing information to be converted into a PJL command into a PJL command. The printing information to be converted into a PJL command may be included in the driver 160 by a user's selection or a driver manufacturer.

The driver 160 may include a preset printing option. The printing option that the conversion unit 150 may not provide may generate print data to which the preset printing option can be applied.

If the printing information (Devmode) provided by the conversion unit 150 is contradictory to the printing option preset on the driver 160, the driver 160 may control the user interface 130 to display the contradictory printing option. The driver 160 may generate print data using the printing option corresponding to a user's selection. That is, the driver 60 may generate print data with the second setting information and the first setting information.

If the PJL generator 153 can generate a PJL command, and the driver 160 may combine the generated PJL command with the changed PJL command.

The driver 160 may generate print data when a converted digital signature is valid. Alternately, the driver 160 may generate print data for the area corresponding to a valid digital signature. Specifically, the driver 160 may generate print data according to information of a page transferred from the digital signature processor 155. For example, if a digital signature to limit a printing job on pages 2 and 3 is set on an XPS file having total 10 pages, the driver 160 may generate print data corresponding to pages 1 and 4 to 10 of the XPS file. The driver 160 may generate print data indicating an error message according to the information on pages to be printed. For example, if a digital signature to limit a printing job on pages 2 and 3 is set on an XPS file having total 10 pages, the driver 160 can generate print data corresponding to pages 1 and 4 to 10 of an XPS file, and can generate print data having error messages corresponding to pages 2 and 3.

The controller 170 can control each element in the printing control terminal device 100. Specifically, if a user inputs a command to print an XPS file through the user interface 130, the controller 170 may control the analyzing unit 140 and the conversion unit 150 to convert information set on the selected XPS file to be recognized by the image forming apparatus. The controller 170 may control the driver 160 to generate PDL print data that the image forming apparatus can recognize according to the converted information.

The controller 170 can control the communication interface 110 to transmit the generated PDL print data to the image forming apparatuses 10-1, 10-2, . . . . If the conversion unit 150 generates a PJL command, the controller 170 may control the communication interface 110 to sequentially transmit the PJL command generated by the conversion unit 150 and the print data generated by the driver 160.

If there is a contradictory printing option to a printing option preset on the driver 160 among printing options set on an XPS file, or if there is an unavailable printing option for the image forming apparatus among printing options set on an XPS file, the controller 170 may control the user interface 130 to display this information. If a user selects a printing option to be applied from among contradictory printing options through the user interface 130, the controller 170 may control the conversion unit 150 to apply the selected printing option.

The controller 170 may store the print data generated by the driver 160 in the storage unit 120. Specifically, since a user can repeatedly perform a printing job on the same XPS file, the controller 170 may store the print data generated by the driver 160. In this situation, the controller 170 may store print data generated by the driver 160 in the storage unit 120 under a file name selected by a user or a prestored XPS file name. The operation may be performed by a user's selection, and may also be performed automatically without an additional command to store the print data.

As the printing control terminal device 100 according to the exemplary embodiments of the present general inventive concept can generate print data corresponding to an XPS file so that a printing option, a core property, and information on a digital signature set on the XPS file are not lost, the printing control terminal device 100 may perform a printing job which is suitable for a user's intension. In addition, as a digital signature and a core property set on an XPS file are not lost when print data is generated, security of a document may be increased.

The exemplary embodiments of the present general inventive concept can recognize a printing option, a core property, and information on a digital signature set on an XPS file and to apply one or more of them as explained above with reference to FIG. 1. Exemplary embodiments of the present general inventive concept may apply at least one of or a combination of a printing option, a core property, and information on a digital signature set on an XPS file.

In FIG. 1, the analyzing unit 140 and the conversion unit 150 may be separate from the driver 160, but the functions of the analyzing unit 140 and the conversion unit 150 may be added to the driver 160. The functions of the analyzing unit 140, the conversion unit 150, and the driver 160 may be packed. Thus, if the patch file is installed on a legacy printer driver, the operations according to the exemplary embodiments of the present general inventive concept may be performed. Alternatively, a program of a printer driver to perform the operations may be distributed to users, so that the operations to be performed.

FIG. 2 is a view illustrating an option related to a printing option 'Banner Sheet' to be set on an XPS file.

Referring to FIG. 2, a display 200 illustrates the printing option 'Banner Sheet' to be set on an XPS file may include 'None' 201, 'Standard' 202, and 'Custom' 203. If the option 'None' 201 is selected, a banner sheet may not be outputted. If the option 'Standard' 202 is selected, a banner sheet can be generated and output. If the option 'Custom' 203 is selected, a custom banner sheet can be output. If the psk:BannerSheetSource property is not included and/or specified in a PrintTicket document, the setting may be ignored, and a predetermined setting (e.g., a default setting) may be used.

Figure 3:

The printing information processor 151 may include a lookup table 300 for the printing option 'Banner Sheet' as illustrated in FIG. 3.

In the lookup table 300 of FIG. 3, the printing option 'BannerSheet' can include 'None' 201, 'Standard' 202, and 'Custom' 203, and the printing information 'Devmode' can include 'ubJobBannerSheet=0', 'ubJobBannerSheet=1', and 'ubJobBannerSheet=2' for each of 'None' 201, 'Standard' 202, and 'Custom' 203. A core property for each printing option can include values 0, 1, and 2 in exemplary embodiments of the present general inventive concept, but these exemplary embodiments may include other values.

If the printing option 'Standard' 202 is set for the printing option 'Banner Sheet', the printing information processor 151 may convert the printing option 'Banner Sheet' into printing information 'ubJobBannerSheet=1' with at least a portion of the lookup table 300.

FIG. 4 is a detailed view illustrating the printing option 'Custom' 203 among printing options for the printing option 'Banner Sheet'.

The printing option 'Banner Sheet' in display 400 may be set so as to satisfy a rule with respect to the printing option 'Custom' 203 as illustrated in FIG. 4. A rule to be satisfied may be, for example: that the psf:MinLength Property Value may be 0 or greater; that the psf:MaxLength Property Value may be greater than the psf:MinLength Property Value; that the psf:MaxLength Property Value is less than a predetermined number size (e.g. 65535 bytes and/or any other suitable size); that the psf:Mandatory Property Value may be a psk:Conditional value; and/or that the psf:UnitType Property Value may be characters and/or a predetermined number of characters.

Figure 6:

Information as to the 'Custom' 203 of the printing option 'Banner Sheet' may be stored in a lookup table 600 illustrated in FIG. 6.

Referring to FIG. 6, the lookup table 600 can include a condition for the printing information, which is different from the lookup table 300 of FIG. 3, which includes a plurality of options for the printing option 'Banner Sheet'.

Figure 5:
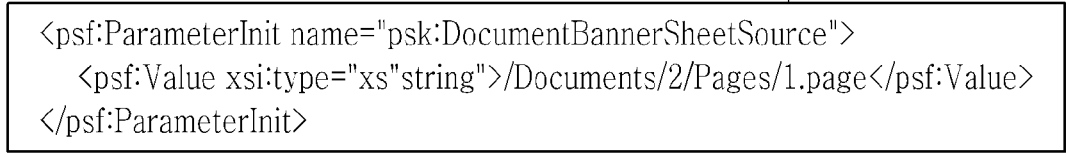

If the printing option 'Banner Sheet' is set on an XPS file as illustrated in display 500 of FIG. 5 (e.g., "psk:DocumentBannerSheetSource"), the printing information processor 151 can recognize a page corresponding to a location of a source set on an XPS file (for example, the first document corresponds to pages 1 to 5, and the second document corresponds to pages 6 to 10), and can convert the printing option of FIG. 5 into the printing information 'ub_BannerSource=5'.

The printing option 'Banner Sheet' set on an XPS file has been explained above with reference to FIGS. 2 to 6, but another printing option set on an XPS file may be converted into printing information through the above process.

Figure 7:
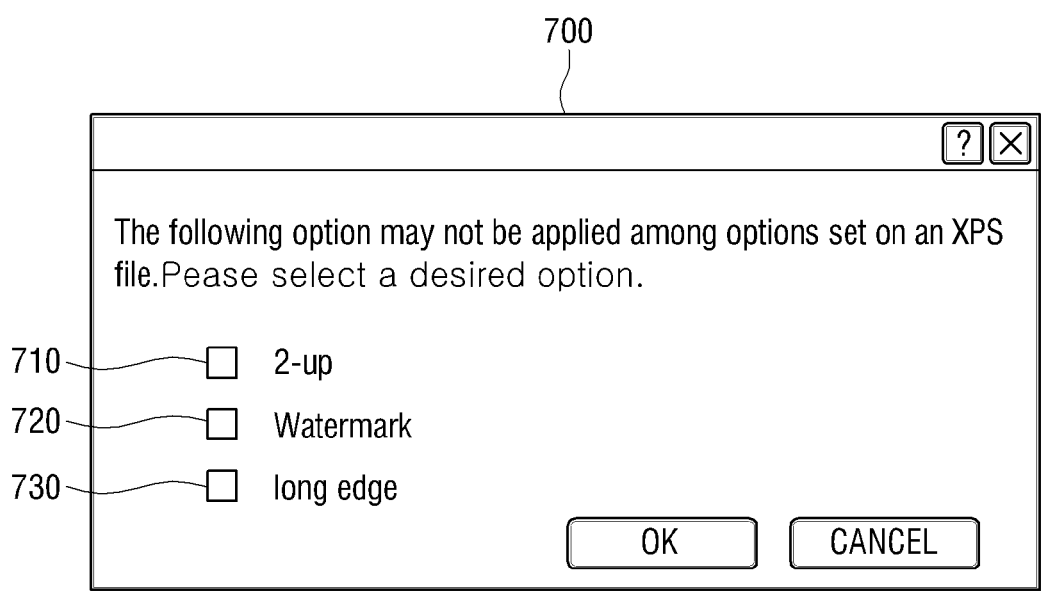
FIG. 7 is a view illustrating a display including a user interface of a printing control terminal device according to exemplary embodiments of the present general inventive concept.

FIG. 7 is a schematic view illustrating a display 700 of a user interface of a printing control terminal device (e.g., printing control terminal device 100 illustrated in FIG. 1) according to exemplary embodiments of the present general inventive concept.

Referring to FIG. 7, among printing options set on an XPS file, printing options 710, 720, 730 contradictory to a printing option preset on the driver 160 may be displayed in display 700. In exemplary embodiments of the present general inventive concept, only the printing option which is set on an XPS file may be displayed. The printing option set on an XPS file may be displayed together with printing options contradictory to a printing option preset on the driver 160.

Therefore, a user may recognize contradictory printing options (e.g., the contradictory printing options as displayed in display 700 of FIG. 7), and thus set a contradictory printing option to be applied.

In the exemplary embodiments of the present general inventive concept illustrated in FIG. 7, only the contradictory printing options are displayed. However, if printing options that the image forming apparatus does not support are set on an XPS file, the user interface may display the unavailable printing options in a window and/or display screen.

FIG. 8 illustrates a display 800 including options of 'JobDigitalSignatureProcessing Option' that may be set in an XPS file. Specifically, the printing option 'JobDigitalSignatureProcessing Option' can include to a digital signature.

Referring to display 800 illustrated in FIG. 8, the printing option 'JobDigitalSignatureProcessing Option' may include 'PrintInvalidSignatures' 810, 'PrintInvalidSignatureWithErrorReport' 820, and 'PrintOnlyValidSignature' 830. The option PrintInvalidSignatures' 810 may specify that the print job may be output regardless of the validity of one or more digital signatures. That is, digital signatures may be ignored. The option 'PrintInvalidSignatureWithErrorReport' 820 may specify that the print job can be output regardless of the validity of the digital signatures. That is, if an invalid signature and/or a signature is not verifiable, and error page can be printed as the last sheet of a print job. The option 'PrintOnlyValidSignature' 830 may specify that the print job can be output if at least one digital signature is verifiable (e.g., all digital signatures are verifiable).

The digital signature processor 155 may have a lookup table 900 which lists information on the printing option 'JobDigitalSignature Processing' as illustrated in FIG. 9.

In the lookup table 900 of FIG. 9, the printing option 'JobDigitalSignatureProcessing Option' includes 'PrintInvalidSignatures' 810, 'PrintInvalidSignatureWithErrorReport' 820, and 'PrintOnlyValidSignature' 830, and the printing information 'Devmode' includes 'DigitalSignature[PageNumber].ubPrintPage=1, DigitalSignature[PageNumber].ubErrorSheet=0' 'DigitalSignature[PageNumber].ubPrintPage=0, DigitalSignature[PageNumber].ubErrorSheet=1', and 'DigitalSignature[PageNumber].ubPrintPage=0, DigitalSignature[PageNumber].ubErrorSheet=0'.

Accordingly, if 'PrintInvalidSignatureWithErrorReport' 820 of the printing option 'JobDigitalSignatureProcessing Option' is set on an XPS file, and an invalid digital signature is set on page 4, the digital signature processor 155 may convert the printing option into the printing information 'DigitalSignature[4].ubPrintPage=0, DigitalSignature[4].ubErrorSheet=1' using the lookup table 900.

As described above, even if a printing option related to a digital signature is set on an XPS file, the printing control terminal device according to exemplary embodiments of the present general inventive concept can convert the printing option into printing information that the image forming apparatus can recognize, to increase security for the XPS file.

Figure 10:

FIG. 10 includes a display 1000 illustrating a core property set on an XPS file according to exemplary embodiments of the present general inventive concept.

Referring to FIG. 10, an XPS file may include a core property as illustrated in display 1000 of FIG. 10. However, a conventional image forming apparatus may have increased difficulty in searching for print data and performing a security printing job on the print data as a driver may not transfer such a core property to the image forming apparatus.

The PJL generator 153 according to the exemplary embodiments of the present general inventive concept may convert a printing option into a PJL command illustrated in display 1100 of FIG. 11 using a core property illustrated in display 1000 of FIG. 10. Accordingly, the image forming apparatus may search for print data previously received, and perform a security printing job on the print data as the image forming apparatus can receive a core property through the PJL command.

FIG. 12 is a view illustrating a sample code of a configuration module in a display 1200 according to exemplary embodiments of the present general inventive concept.

Referring to FIG. 12, a configuration module illustrated in the display 1200 may generate a print ticket for a current XPS file when one or more of the following exemplary events occur: DOCUMENTEVENT_XPS_ADDFIXEDDOCUMENTSEQUENCEPRINTTICKETPRE (job level); DOCUMENTEVENT_XPS_ADDFIXEDDOCUMENTPRINTTICKETPRE (document level); and/or DOCUMENTEVENT_XPS_ADDFIXEDPAGE-
PRINTTICKETPRE (page level).

The conversion unit 150 illustrated in FIG. 1 can combine print tickets of one or more levels (e.g., each level) received through the configuration module (e.g., the job level, the document level, the page level, and/or any other suitable level to carry out the exemplary embodiments of the present general inventive concept), and can convert the combined print ticket into printing information.

Figure 13:
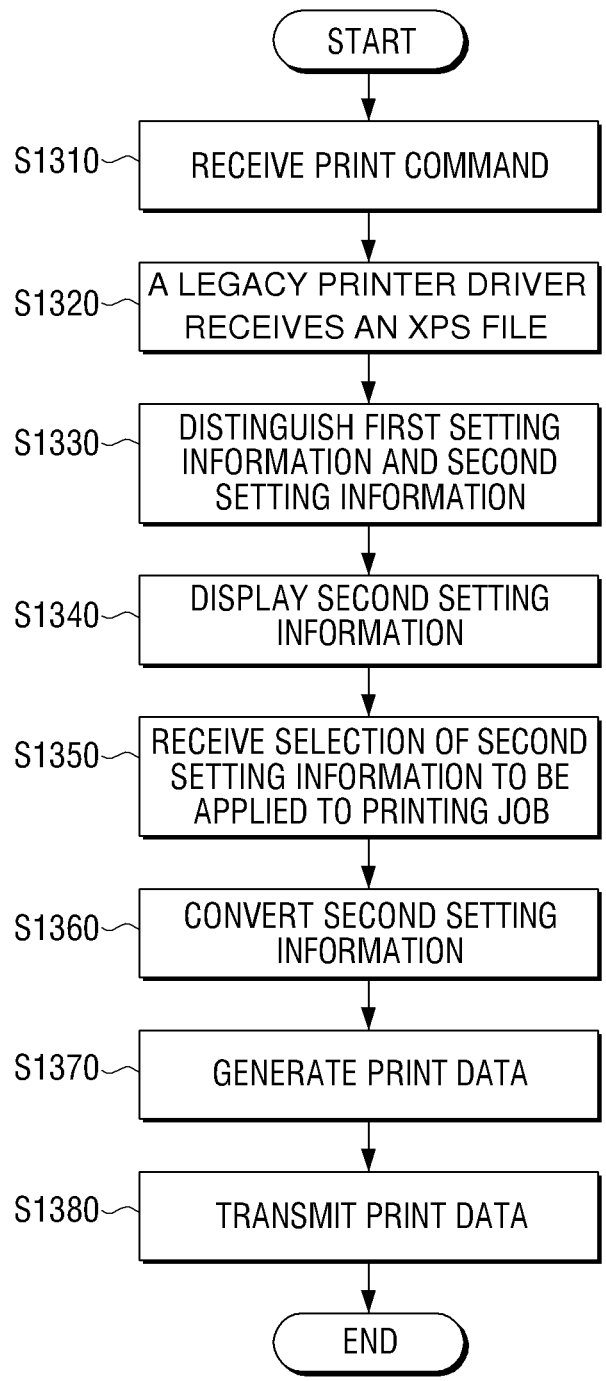
FIG. 13 is a flowchart illustrating a method of printing an XPS file according to exemplary embodiments of the present general inventive concept.

FIG. 13 is a flowchart to illustrate a method of printing an XPS file according to exemplary embodiments of the present general inventive concept.

If a command to print an XPS file is received in operation S1310, the XPS file can be received from a legacy printer driver in operation S1320. Herein, the legacy printer driver may be a printer driver such as an SPL printer driver, a PCL printer driver, a PS printer driver, a Linux printer driver, and an MAC printer driver rather than an XPS printer driver.

The legacy printer driver may distinguish the first setting information to be applied to a printing job and the second setting information that may not be applied to a printing job (e.g., incapable of being applied to a printing job) using at least one of a print ticket, a core property, and a digital signature in operation S1330. The legacy printer driver may analyze a printing option, a core property, and information of at least a digital signature set on an XPS file by parsing the XPS file. The more detailed operation of analyzing a printing option, a core property, and information on a digital signature set on an XPS file has described above with reference to FIG. 1, and thus additional explanation will be omitted. The printing option, the core property, and the information on a digital signature that a legacy printer driver and an image forming apparatus can analyze may be classified as the first setting information, and unanalyzed printing option, core property, and information may be classified as the second setting information.

The printing control terminal device 100 can display the second setting information which may not be applied to a printing job in operation S1340, and can receive a selection of at least one to be applied from among the second setting information from a user in operation S1350. The operation may be performed selectively according to a user's setting or a preset state (e.g., a predetermined selection, a default setting, etc.).

The printing control terminal device 100 may convert at least one of the print ticket, the core property, and the information on a digital signature to be applied to a printing job in operation S1360. Specifically, the printing control terminal device 100 may convert information regarding a printing option set on an XPS file into printing information, convert a core property included in the XPS file into a PJL command, determine validity of information on a digital signature set on the XPS file, and then generate information as to a page to be output.

The printing control terminal device 100 can determine whether there is a printing option contradictory to a printing option preset on the driver 160 and an unavailable printing option for the image forming apparatus in printing options set on an XPS file, and can convert a printing option into printing information (Devmode) by at least adjusting the contradictory printing option and the unavailable printing option.

The printing control terminal device 100 can generate print data using the converted second setting information and the first setting information in operation S1370. The operation of generating print data has been described with reference to the driver 160 of FIG. 1, and thus overlapping explanation will be omitted.

The printing control terminal device 100 can transfer the generated print data to the image forming apparatus in operation S1380. In more detail, if a PJL command is generated in a previous operation, the printing control terminal device 100 may transmit sequentially the PJL command and the generated print data to the image forming apparatus.

The printing control terminal device 100 can store the generated print data and PJL command. Specifically, since a user can repeatedly perform a printing job on an XPS file, the printing control terminal device 100 may store the generated print data and PJL command. Such an operation may be performed according to a selection by a user, and may also be performed automatically without an additional command to store the print data and the PJL command.

Accordingly, the printing control terminal device 100 according to exemplary embodiments of the present general inventive concept may not lose and/or may minimize loss of a print ticket set on an XPS file when generating print data, and thus a user can obtain a result suitable for a his or her intention. In addition, the printing control terminal device 100 may not lose and/or may minimize loss of a digital signature set on an XPS file, and thus a security set on the XPS file can be increased. The method of printing an XPS file as illustrated in FIG. 13 may be performed with the printing control terminal device of FIG. 1, and may also be performed with other printing control terminal devices that carry out the exemplary embodiments of the present general inventive concept as disclosed herein.

Figure 14:
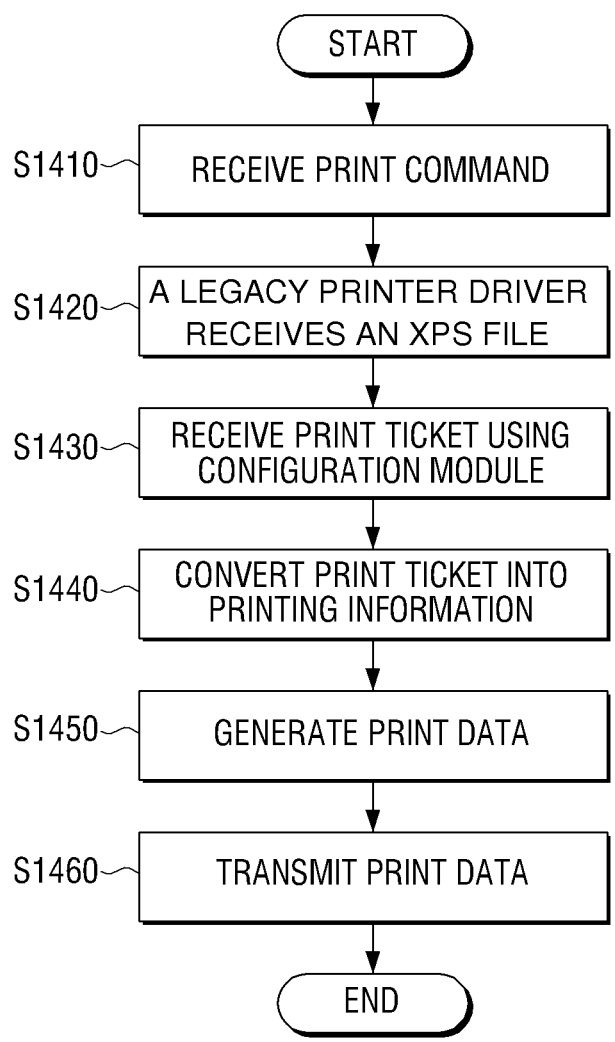
FIG. 14 is a flowchart illustrating a method of printing an XPS file according to exemplary embodiments of the present general inventive concept.

FIG. 14 is a flowchart provided to illustrate a method of printing an XPS file according to exemplary embodiments of the present general inventive concept.

If the printing control terminal device 100 receives a command to print an XPS file in operation S1410, the printing control terminal device 100 receives an XPS file from a legacy printer driver in operation S1420. Herein, the legacy printer driver may be a printer driver such as an SPL printer driver, a PCL printer driver, a PS printer driver, a Linux printer driver, and an MAC printer driver rather than an XPS printer driver.

The printing control terminal device 100 can receive a print ticket included in an XPS file through a configuration module in operation S1430. The operation of the configuration module has been described above with reference to FIG. 12, and thus detailed explanation will be omitted.

The printing control terminal device 100 can convert the received print ticket into printing information (Devmode) in operation S1440. Specifically, the print ticket received through the configuration module may be separated for one or more levels (e.g., each level and the one or more print tickets may be received. The printing control terminal device 100 can combine the print tickets for each level and can convert the combined print ticket into printing information.

The printing control terminal device 100 can generate print data using the printing information on the legacy printer driver in operation S1450. The operation of generating the print data has been described above with reference to the driver 160 of FIG. 1, and thus overlapping explanation will be omitted.

The printing control terminal device 100 can transmit the generated print data to the image forming apparatus in operation S1460. In more detail, if a PJL command is generated in a previous operation, the printing control terminal device 100 may sequentially transmit the PJL command and the generated print data to the image forming apparatus.

Accordingly, the printing control terminal device 100 can reduce loss of a print ticket set on an XPS file when generating print data, and thus a user may obtain a result suitable for his or her intention. The method of printing an XPS file as illustrated in FIG. 14 may be performed on a printing control terminal device of FIG. 1, and may also be performed on other printing control terminal devices that carry out the exemplary embodiments of the present general inventive concept as disclosed herein.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A printing control terminal device to be communicatively coupled to at least one image forming apparatus, the printing control terminal device on which a printer driver to print an XML paper specification (XPS) file is not installed, the printing control terminal device comprising:
a user interface to receive a command to print an XPS file on an XPS viewer;
an analyzing unit to analyze a digital signature included in the XPS file, to distinguish a first setting information to be applied to a printing job and a second setting information not to be applied to a printing job, to determine whether the XPS file has one or more printing options contradictory to a corresponding printing option preset on a driver, and to control the user interface to display a listing of the one or more contradictory printing options when the contradictory one or more printing options is determined;
a conversion unit to convert the digital signature into a digital signature format to be applied to the printing job corresponding to the distinguished second setting information, and to convert printing option information into printing information by converting an unavailable printing option of the at least one image forming apparatus into an available printing option;
the driver to generate print data using the converted second setting information and the first setting information, or according to a selection received from the user interface for the contradictory option or the converted printing option; and
a communication interface to transmit the generated print data to the at least one image forming apparatus,
wherein the second setting information includes at least one of a core property, a banner output, N-up, a booklet, and a watermark.

2. The printing control terminal device of claim 1, wherein the driver includes a printer command language (PCL) printer driver.

3. The printing control terminal device of claim 1, wherein the setting information includes printing information on a legacy printer driver that is a non-XPS driver corresponding to a print ticket, and the analyzing unit distinguishes the first setting information when the printing information is applied to a printing job and distinguishes the second information when the printing information is not applied to a printing job.

4. The printing control terminal device of claim 1, wherein:
the user interface displays the second setting information which is not applied to the printing job, and receives a selection of at least one setting to be applied to the printing job from among the second setting information; and
the driver generates print data using the second converted setting information corresponding to the selected information and the first setting information.

5. The printing control terminal device of claim 1, wherein the driver generates the print data when the converted digital signature is valid.

6. The printing control terminal device of claim 5, wherein the XPS file includes at least one digital signature, and the driver generates print data for an area corresponding to a valid digital signature.

7. The printing control terminal device of claim 1, wherein the conversion unit converts a core property into a printer job language (PJL) command.

8. The printing control terminal device of claim 1, wherein the conversion unit receives a print ticket included in the XPS file through a configuration module, and converts the received print ticket into printing information.

9. A method of printing an XML paper specification (XPS) file of a printing control terminal device to be communicatively coupled to at least one image forming apparatus, the printing control terminal device on which a printer driver to print an XML paper specification (XPS) file is not installed, the method comprising:
receiving a command to print an XPS file on an XPS viewer;
receiving the XPS file on a legacy printer driver that is a non-XPS driver;
analyzing a digital signature included in the XPS file, and distinguishing a first setting information to be applied to a printing job and a second setting information not to be applied to a printing job;
determining whether the XPS file has one or more printing options contradictory to a corresponding printing option preset on a driver, and displaying a listing of the one or more contradictory printing options on a user interface when the contradictory one or more options is determined;
converting the digital signature into a digital signal format to be applied to the printing job corresponding to the second distinguished setting information;
converting printing option information into printing information by converting an unavailable printing option of the at least one image forming apparatus into an available printing option;
generating print data using the second converted setting information and the first setting information or according to a selection received from the user interface for the contradictory option or the converted printing option; and
transmitting the generated print data to the image forming apparatus, wherein the second setting information includes at least one of a core property, a banner output, N-up, a booklet, and a watermark.

10. The method of claim 9, wherein the legacy printer driver includes a printer command language (PCL) printer driver.

11. The method of claim 9, wherein the setting information includes printing information on the legacy printer driver corresponding to the print ticket, and the analyzing distinguishes the first setting information when the printing information is applied to a printing job and distinguishes the second information when the printing information is not applied to a printing job.

12. The method of claim 9, further comprising:
displaying the second setting information which is not applied to the printing job; and
receiving a selection of at least one setting to be applied to the printing job from among the second setting information,
wherein the generating generates print data using the second converted setting information corresponding to the selected information and the first setting information.

13. The method of claim 9, wherein the generating generates the print data when the converted digital signature is valid.

14. The method of claim 13, wherein the XPS file includes at least one digital signature, and the driver generates print data for an area corresponding to a valid digital signature.

15. The method of claim 9, wherein the converting converts a core property into a printer job language (PJL) command.

16. A method of printing an XML paper specification (XPS) file of a printing control terminal device to be communicatively coupled to at least one image forming apparatus, the printing control terminal device on which a printer driver to print an XML paper specification (XPS) file is not installed, the method comprising:
receiving a command to print an XPS file on an XPS viewer;
receiving the XPS file on a legacy printer driver;
receiving a print ticket included in the XPS file through a configuration module;
distinguishing a first setting information to be applied to a printing job and a second setting information not to be applied to a printing job from the received XPS file including the print ticket according to a digital signature included in the XPS file;
determining whether the XPS file has one or more printing options contradictory to a corresponding printing option preset on a driver, and displaying a listing of the one or more contradictory printing options on a user interface when the contradictory one or more options is determined;
converting the received print ticket into printing information having a format to be applied to the print job corresponding to the second distinguished setting information;
converting printing option information into printing information by converting an unavailable printing option of the at least one image forming apparatus into an available printing option according to a received selection from the user interface;
generating print data using the printing information or according to the a selection received from the user interface for the contradictory option or the converted printing option; and
transmitting the generated print data to the image forming apparatus,
wherein the second setting information includes at least one of a core property, a banner output, N-up, a booklet, and a watermark.

17. A method of printing an XML paper specification (XPS) file of a printing control terminal device with at least one image forming apparatus that is communicatively coupled to the printing control terminal device, the method comprising:
receiving an XPS file including a print ticket and a command to print the XPS file;
distinguishing a first setting information to be applied to a printing job and a second setting information not to be applied to a printing job from the received XPS file including the print ticket according to a digital signature included in the XPS file;
determining whether the XPS file has one or more printing options contradictory to a corresponding printing option preset on a driver, and displaying a listing of the one or more contradictory printing options on a user interface when the contradictory one or more options is determined;
converting the received print ticket into printing information having a format to be applied to the printing job corresponding to the second distinguished setting information;
converting printing option information into printing information by converting an unavailable printing option of the at least one image forming apparatus into an available printing option;
generating print data using the printing information or according to the a selection received from the user interface for the contradictory option or the converted printing option; and
sending the generated print data to the image forming apparatus to be printed,
wherein the second setting information includes at least one of a core property, a banner output, N-up, a booklet, and a watermark.

18. The method of claim 17, further comprising:
analyzing at least one of a print ticket, a core property, and a digital signature included in the XPS file.

19. The method of claim 18, wherein the converting comprises:
converting the at least one print ticket, the core property, and the digital signature corresponding to the second distinguished setting information.

20. The method of claim 18, wherein the generating the print data comprises:
generating print data using the second converted setting information and the first setting information.

21. A printing control terminal apparatus communicatively coupled to at least one image forming apparatus, the printing control terminal apparatus comprising:
an interface to receiving an XML paper specification (XPS) file including a print ticket and a command to print the XPS file; and
a controller to distinguish a first setting information to be applied to a printing job and a second setting information not to be applied to a printing job from the received XPS file including the print ticket according to a digital signature included in the XPS file, to determine whether the XPS file has one or more printing options contradictory to a corresponding printing option preset on a driver, and to control a user interface to display a listing of the one or more contradictory printing options when the contradictory one or more printing options is determined, to convert printing option information into printing information having a format to be applied to the printing job by converting an unavailable printing option of the at least one image forming apparatus into an available printing option according to a received selection from the interface, to convert the received print ticket into printing information and to generate print data using the printing information corresponding to the second distinguished setting information or according to a selection received from the user interface for the contradictory option or the converted printing option;

wherein the generated print data is transmitted to the image forming apparatus with the interface, and wherein the second setting information includes at least one of a core property, a banner output, N-up, a booklet, and a watermark.

* * * * *